(12) United States Patent
Falk et al.

(10) Patent No.: US 8,195,191 B1
(45) Date of Patent: Jun. 5, 2012

(54) METHOD AND APPARATUS FOR COMMUNICATING LOCATION OF A SPLIT-SECTOR IN A CELLULAR WIRELESS COMMUNICATION SYSTEM

(75) Inventors: Alan J. Falk, Olathe, KS (US); Darrin C. Mott, Gardner, KS (US); Amy J. Giesken, Olathe, KS (US); Larry R. Dreiling, Parkville, MO (US); Julie A. Hart, Raymore, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 649 days.

(21) Appl. No.: 12/366,228

(22) Filed: Feb. 5, 2009

(51) Int. Cl.
*H04W 24/00* (2009.01)
(52) U.S. Cl. ............... 455/456.1; 455/404.2; 455/440; 455/457
(58) Field of Classification Search .................. None
See application file for complete search history.

(56) References Cited

U.S. PATENT DOCUMENTS

| 7,072,666 | B1 | 7/2006 | Kullman et al. |
| 7,123,928 | B2 | 10/2006 | Moeglein et al. |
| 7,366,492 | B1 * | 4/2008 | Ganesh ...................... 455/404.2 |
| 2002/0151309 | A1 * | 10/2002 | Johnson et al. ............... 455/447 |
| 2003/0125044 | A1 * | 7/2003 | Deloach et al. ............... 455/456 |
| 2004/0203880 | A1 * | 10/2004 | Riley ......................... 455/456.1 |
| 2007/0178945 | A1 * | 8/2007 | Cook et al. .................... 455/572 |
| 2008/0161012 | A1 * | 7/2008 | Haran et al. ................ 455/456.1 |

* cited by examiner

*Primary Examiner* — Rafael Pérez-Gutiérrez
*Assistant Examiner* — Daniel Nobile

(57) ABSTRACT

A method and apparatus for communicating the location of a split sector in a cellular wireless communication system. A processor receives a definition of the separate coverage areas defining the split sector and programmatically determines whether a minimum composite angle spanning the coverage areas exceeds a threshold such as 180°. If so, the processor establishes an data-representation of the split sector as an omnidirectional sector. Otherwise, the processor establishes a data-representation of the split sector as a non-omnidirectional sector. The processor may then communicate the established data-representation for use as a basis to facilitate a location-based service keyed to the location of the split sector, such as response to an emergency service call for instance.

20 Claims, 9 Drawing Sheets

SINGLE-COVERAGE SECTOR

SPLIT-SECTOR

Fig. 10 - part 1

```
Function splitbw(ByVal az1, bw1, az2, bw2 As Long) As Long
    Dim bigazimuth As Integer
    bigazimuth = az1 - az2
    Select Case bigazimuth
    Case Is >= 0
        If (az1 - az2) < 180 Then
            splitbw = az1 + (bw1 / 2) - (az2 - (bw2 / 2))
        Else: splitbw = (360 - ((az1 - (bw1 / 2))) + (az2 + (bw2 / 2)))
        End If
    Case Is < 0
        If (az2 - az1) < 180 Then
            splitbw = az2 + (bw2 / 2) - (az1 - (bw1 / 2))
        Else: splitbw = (360 - ((az2 - (bw2 / 2))) + (az1 + (bw1 / 2)))
        End If
    End Select
    If splitbw > 180 Then
        splitbw = 360
    End If
End Function
```

Fig. 10 – part 2

```
Function splitaz(ByVal az1, bw1, az2, bw2, splitbw As Long) As Long
    Dim bigazimuth As Integer
    bigazimuth = az1 - az2
    Select Case bigazimuth
    Case Is >= 0
        If (az1 - az2) < 180 Then
            splitaz = (az1 + (bw1 / 2)) - (splitbw / 2)
            Else
                If ((az1 - (bw1 / 2)) + (splitbw / 2)) > 360 Then
                    splitaz = (((az1 - (bw1 / 2)) + (splitbw / 2)) - 360)
                    Else: splitaz = (az1 + (bw1 / 2)) - splitbw / 2
                End If
        End If
    Case Is < 0
        If (az2 - az1) < 180 Then
            splitaz = (az2 + (bw2 / 2)) - (splitbw / 2)
            Else
                If ((az2 - (bw2 / 2)) + (splitbw / 2)) > 360 Then
                    splitaz = (((az2 - (bw2 / 2)) + (splitbw / 2)) - 360)
                    Else: splitaz = (az2 + (bw2 / 2)) - splitbw / 2
                End If
        End If
    End Select
    If splitbw > 180 Then
        splitaz = 0
    End If
    If splitaz < 0 Then
        splitaz = 0
    End If
End Function
```

METHOD AND APPARATUS FOR COMMUNICATING LOCATION OF A SPLIT-SECTOR IN A CELLULAR WIRELESS COMMUNICATION SYSTEM

BACKGROUND

Cellular wireless is an increasingly popular means of personal communication in the modern world. In a cellular wireless network, a coverage area is divided into a number of sectors defined by radiation patterns from base stations. A mobile station, such as a cellular telephone, personal digital assistant (PDA), cellular modem, or other such device, may then communicate with the base station via a radio frequency air interface. In turn, each base station is typically coupled with other access equipment, such as a gateway or switch, to provide connectivity with a transport network such as the public switched telephone network (PSTN) or the Internet. A person using a mobile station can thereby communicate over the transport network from virtually any place inside the cellular coverage area.

An important feature of contemporary cellular wireless networks is an ability to locate the geographical position of a mobile station.

Such a feature was initially developed to assist emergency services in locating a mobile station. For example, in the United States, the Federal Communications Commission (FCC) has mandated the implementation of "Enhanced 911" (E911) services, which includes a requirement for cellular wireless carriers to report mobile station location to a public safety access point (PSAP) when connecting a call from a mobile station to the PSAP. In particular, when connecting an emergency services call, a wireless carrier may determine the location of the calling mobile station and provide an indication of that location to the called PSAP. Emergency service personnel can then be dispatched to the mobile station's location, to assist the caller.

The availability of location information to support E911 services has given rise to the development of many other location-based services as well. For instance, given the location of a mobile station, a location-based service provider (e.g., a cellular wireless carrier or third party) can provide the mobile station user with a weather or traffic report relevant for the user's location. As another example, a location-based service provider can report a list of services or establishments (e.g., restaurants, parks, theatres, etc.) in the user's vicinity. As still another example, a location-based service provider can provide a mobile station user with a map of the user's location or with directions for travel between the user's location and another location. And as yet another example, knowing that a mobile station is operating in a particular location, a location-based service provider can send the mobile station a location-based message, such as an advertisement or coupon for a nearby establishment. Other location-based services exist currently or will be developed in the future as well.

In many cases, a wireless carrier can identify the location of a mobile station based on the location of coverage provided by the sector in which the mobile station is located. In particular, a carrier usually maintains in a home location register (HLR) or other profile store an indication of the sector in which each active mobile station is operating, and a carrier also maintains or provides a set of "base station almanac" (BSA) data that specifies the geographic location of each sector in the carrier's market. Thus, when a carrier needs to determine the mobile station's location, the carrier can refer to the profile store in order to identify the sector in which the mobile station is operating, and the carrier may then refer to the BSA data to determine the geographic location of that sector. The carrier may then use that sector location as an approximation of the mobile station's location, to facilitate providing a location-based service.

For a typical sector, the BSA data may define the location of the sector by specifying various attributes such as (i) base station location, (ii) azimuth, (iii) beamwidth, and (iv) centroid. FIG. 1 helps explain these attributes. As shown in FIG. 1, a sector 12 emanates from a base station 14, which is at a location typically defined by latitude and longitude coordinates. Based on the antenna configuration at the base station, sector 12 emanates with an azimuth 16, which represents an angle measured from a reference direction such as due North for instance. As shown, the sector 12 defines a coverage angle that is substantially centered about the azimuth 16 and provides a beamwidth 18 extending in a polar direction from an initial line 20 to a terminal line 22. Based on signal strength or other data regarding the sector, a centroid 24 of the sector may then be defined as a point on the azimuth, representing approximately the center of the area of wireless coverage provided by the sector. This type of BSA data can be established by engineering analysis and input at the time base station 14 is installed or configured and can be updated from time to time.

In practice, then, when connecting an emergency services call from a mobile station, the mobile station's carrier may determine the sector in which the mobile station is operating and may then give the PSAP an indication of (i) the geographic position or street address of the serving base station tower and (ii) the azimuth at which the sector extends from the base station tower. Emergency service personnel can then work to locate the caller in that general direction from the base station tower. Further, the carrier may give the PSAP an indication of the centroid of the sector, determined based on the base station location, azimuth, beamwidth, and perhaps signal strength measurements. Emergency service personnel can then work to locate the caller around that centroid position, taking into consideration the base station location and the beamwidth of the sector.

When sector information is used as a basis to describe the location of a mobile station, the description is inherently vague, because it is not immediately clear where in the sector the mobile station is actually located. For emergency services, this presents a problem, as emergency service personnel may have trouble locating a mobile caller within a given sector. Similarly, some other location-based services may depend on knowing more precisely where a given mobile station is located, so the commercial value of those services may diminish due to the imprecision of the location information.

This can be even more of a problem in a "split sector" scenario. A "split sector" is a sector that is defined by two or more (typically two) separate coverage areas that emanate from a given base station but that are considered in combination to represent a single sector (typically sharing common coding and a common sector identification). FIG. 2 shows an example of this scenario, where a base station 30 radiates to define a sector made up of two separate coverage areas 32 and 34.

Typically, the separate coverage areas that cooperatively define a split sector will not overlap at all. However, it is possible that the coverage areas could overlap to some extent. In the usual case, the separate coverage areas will be defined by radiation from respective antenna elements of the base station, so that each coverage area has a respective azimuth and a respective beamwidth. In particular, each coverage area may be considered to define a respective coverage angle having a vertex at the base station and having an initial side and a terminal side. Each coverage area azimuth may then be the direction (e.g., vector) bisecting the angle of coverage, i.e., midway between the initial side of the coverage angle and the terminal side of the coverage angle. And each coverage area beamwidth may be the angle between the initial side of the coverage angle and the terminal side of the coverage angle; in other words, the coverage area beamwidth may equal the coverage angle. Thus, in FIG. 2, coverage area 32 has an initial side 36, a terminal side 38, a beamwidth 40, and an azimuth 42, and coverage area 34 has an initial side 44, a terminal side 46, a beamwidth 48, and an azimuth 50.

It is understood that the polar direction for designating the terminal side of an angle by comparison with the initial side of the angle is a matter of design choice. Typically, the terminal side is located counterclockwise from the initial side. However, a clockwise direction could be used instead if desired, provided that the same convention is used when referring to each coverage area of the split sector. Further, in terms of designating the angle of azimuth for a given coverage area, the reference direction (zero degrees) can be considered to be due North, or can be designated in another manner, again provided that the reference direction is used consistently. Still further, it is understood that the coverage areas being discussed here are the main lobes of the antenna radiation patterns, rather than side lobes or the like. And although the coverage areas of the split sector are shown as about the same size, it is understood that they can be different sizes then each other.

With a split sector scenario like this, an issue is how to designate the location of coverage of the sector, in the BSA data for instance. This is a particular concern where the BSA data should have just one record per sector, with the record specifying (i) base station location, (ii) a single azimuth, and (iii) a single beamwidth, among possibly other data such as a centroid location. Such a constraint on the BSA data may result from the design of position determining equipment (PDE) that makes use of the BSA data. In particular, the position determining equipment may be designed to look for a single BSA record per sector and may not be able to handle two separate records (e.g., two separate azimuths, two separate beamwidths, and two separate centroids) for a single sector. Thus, with the arrangement of FIG. 2, it may be necessary to represent the split sector in the BSA record as a single sector, such as with a single azimuth, a single beamwidth.

OVERVIEW

Disclosed herein is a method and apparatus for communicating the location of a split sector, so as to help facilitate implementation of a location-based service based on the location of the split sector.

BRIEF DESCRIPTION OF THE DRAWINGS

FIG. 10 (parts 1 and 2) is an example program code listing for implementing the present method.

DETAILED DESCRIPTION

Figure 1:
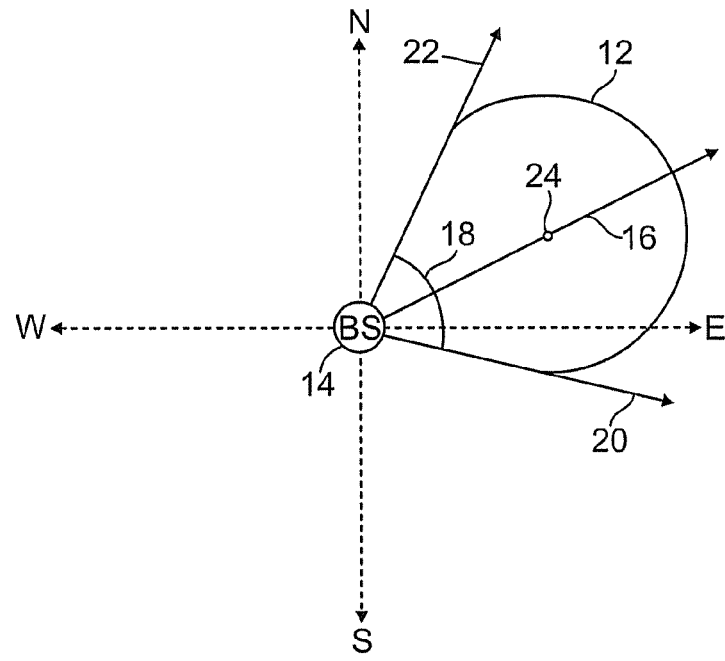
FIG. 1 is an illustration of a conventional sector emanating from a base station.
Figure 2:
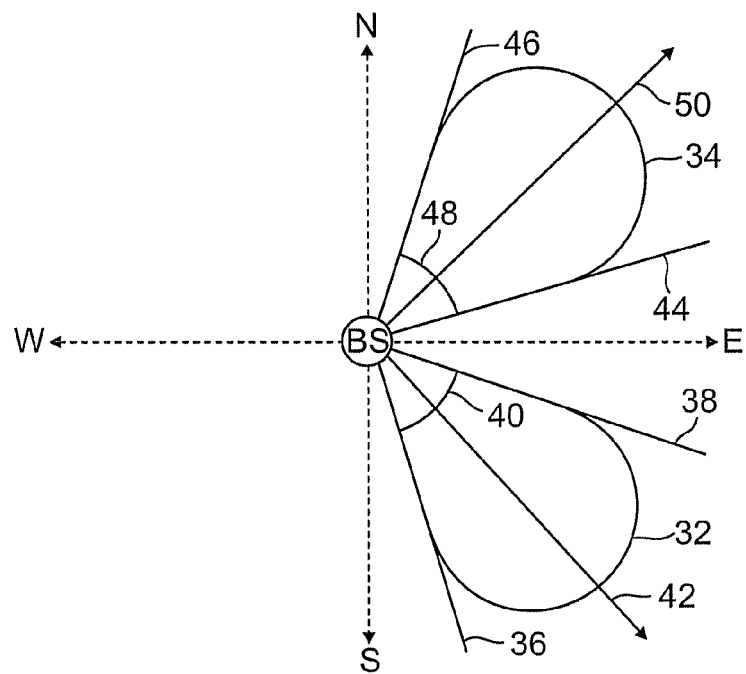
FIG. 2 is an illustration of a split sector emanating from a base station.
Figure 3:
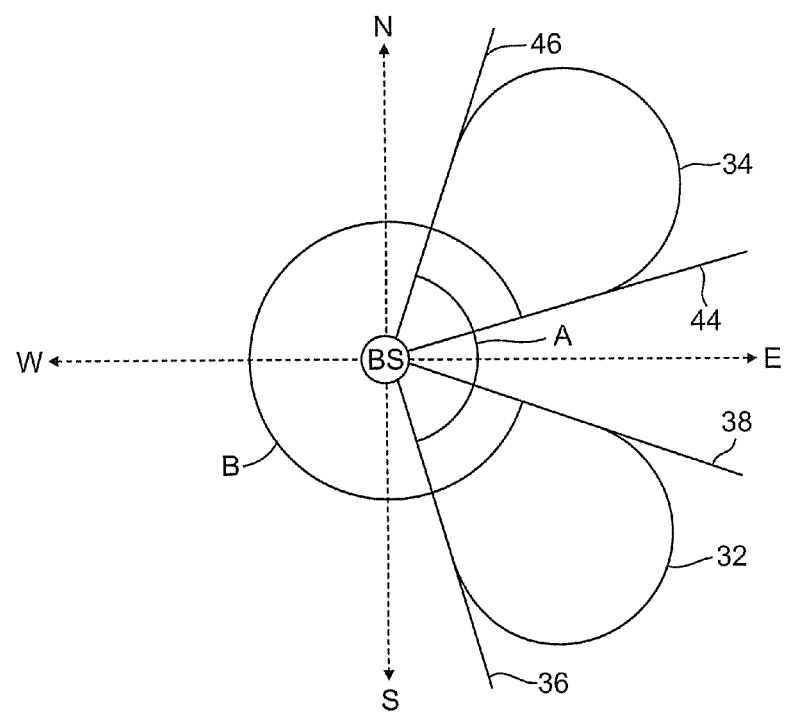
FIG. 3 is an illustration depicting possible composite angles spanning the separate coverage areas of the split sector of FIG. 2.

One way to represent a split sector in data as a single sector is to programmatically combine the coverage angles of the separate coverage areas together into a composite coverage angle and then represent the composite coverage angle by a single beamwidth and a single azimuth, together with at least the base station location. In particular, given two coverage angles, the composite coverage angle would be a minimum angle that spans the two coverage angles and that extends from an edge of one coverage angle to an edge of the other coverage angle. FIG. 3 helps explain this, with respect to the coverage angles shown in FIG. 2.

As shown in FIG. 3, there are two possible composite angles A, B that would span the two coverage angles and that would extend from an edge of one of the coverage angle to an edge of the other coverage angle. A preferred representation of the split sector in this scenario would be the minimum composite angle of these two—namely, composite angle A. Provided with data defining coverage angles 32 and 34 as parts of a split sector, a computer processor may thus programmatically compute the minimum composite angle A.

Given the minimum composite angle and the directions of the two underlying coverage angles, the computer processor may then programmatically generate a data-representation of the split sector by specifying that the split sector has a beamwidth equal to the minimum composite angle A, an azimuth 60 situated within that beamwidth midway between the azimuths 42, 50 or outer edges 36, 46 of the two underlying coverage angles, and a base station location equal to the location of the serving base station 14. Provided with signal strength data or other such data, a computer processor may then compute and include in the data-representation a centroid location 62 for the split sector, typically a point along the split sector azimuth, somewhere away from the base station location, representing approximately the center point of the split sector.

While the process just described is easy to implement, a problem with characterizing a split sector by rote in this manner is that the resulting azimuth 60 would likely end up between the underlying separate coverage areas so that the resulting centroid 62 would likely end up being a point that is not within either of the actual coverage areas of the split sector. When such a characterization of the split sector is used to facilitate a location-based service, the service may likely be off-focus. For instance, when such a characterization is used to facilitate E911 response, emergency personnel may be dispatched to the centroid location that is potentially far away from where the actual coverage of the split sector lies.

Figure 4:
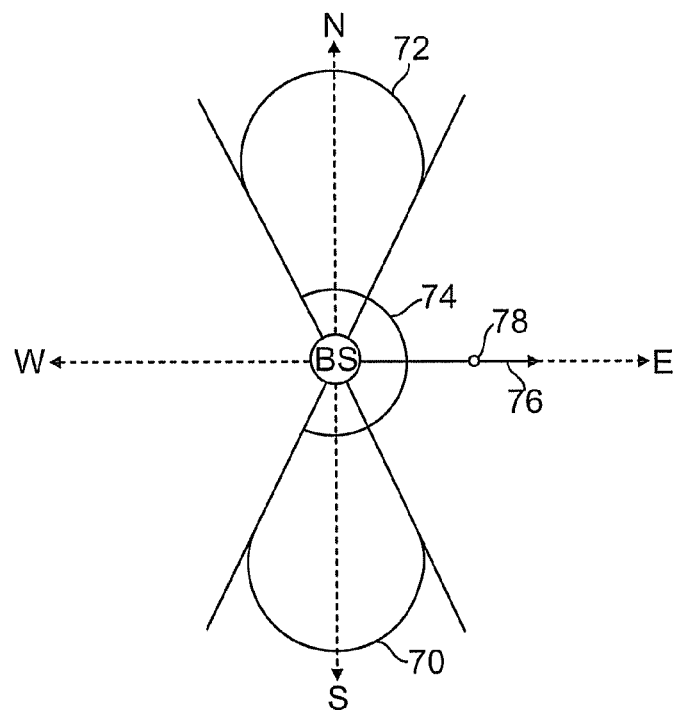
FIG. 4 is an illustration of a split sector made of two underlying coverage areas directly opposing each other.
Figure 5:
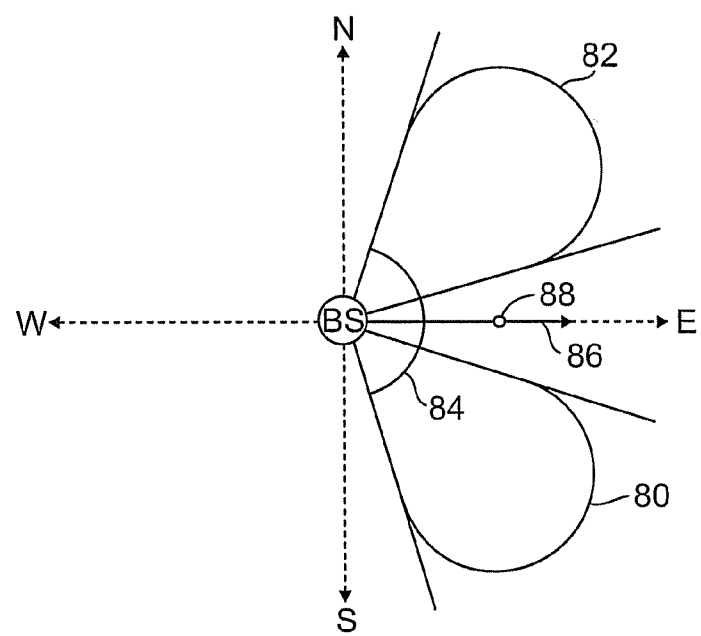
FIG. 5 is an illustration of a split sector made of two underlying coverage areas that are angled toward each other.

When the two underlying coverage areas of a split sector tend to be more directly opposing each other, a better data-representation of the split sector would be as an omni-sector, namely one having a beamwidth of 360°, so that its centroid would be considered to be the base station location. Such a centroid would be a fair approximation of a point between the two underlying coverage areas. On the other hand, when the two underlying coverage areas of a split sector are angled closer together, then the foregoing process of representing the split sector by the composite angle and bisecting azimuth may be suitable, because the resulting centroid may then be closer to the two coverage areas. FIGS. 4 and 5 depict two split-sector scenarios to help explain this.

In FIG. 4, a split sector is shown made of two underlying coverage areas 70, 72 that are directly opposing each other, one facing due north and one facing due south. In this scenario, if we were to represent the split sector by a minimum composite angle 74 spanning the two underlying coverage areas, the resulting azimuth 76 would point due east. (Alternatively, if the two possible composite angles were equal, in which case we could conclude that either was the minimum, it is possible that the azimuth would point due west.) In turn, a centroid 78 based on that resulting azimuth would thus be located a distance from the base station and might not be near either of the actual underlying coverage areas of the split sector. Such a centroid would be a relatively poor estimate of the coverage location of the sector and, specifically, a relatively poor approximation of where a mobile station operating in the sector is currently located.

A better way to represent the split sector of FIG. 4 would be as an omni-sector, in order to have the centroid be the base station location, which is more centrally located between the opposing underlying coverage areas of the split sector. Thus, given the arrangement of FIG. 4, upon determining that the two underlying coverage areas are oriented in substantially opposite directions, a computer processor may instead establish an omni-sector data-representation of the split sector. Such a data-representation would designate a beamwidth of 360° and any azimuth (e.g., 0°) and would designate the base station location. The data-representation may then designate or be interpreted to correspond with a centroid at the base station location. Provided with this omni-sector representation of the split sector, a location-based service provider may then fairly use the base station location as the sector centroid approximation of where a mobile station operating in the sector is located.

FIG. 5, on the other hand, depicts a split sector made of two underlying coverage areas 80, 82 that are not directly opposing each other but are rather angled toward each other, in this example with one facing due northeast and the other facing due southeast. In this scenario, it would make more sense to represent the split sector by the composite coverage angle as discussed above. In particular, a computer processor can represent the split sector by the minimum composite angle 84 spanning the two underlying coverage areas, with an azimuth 86 in this case bisecting the composite angle and thus pointing due east. As a result, a centroid of the sector would be represented as a point 88 along the azimuth, some distance from the base station. But in this case, the centroid would be a more fair approximation of the location of a mobile station operating in the split sector, because the underlying coverage areas of the split sector are angled toward each other rather than tending to directly oppose each other.

As noted above, disclosed herein is thus a method and apparatus to improve how the location of a split sector is communicated, so as to help facilitate implementation of a location-based service based on the location of the split sector. The method may be embodied on a computer program product, such as a disc or storage drive, in the form of machine language instructions executable by a computer processor for instance. An apparatus arranged to implement or facilitate implementation of the method may in turn take various forms, such as a programmed computer, a disc, or a storage drive, among other arrangements now known or later developed.

According to the method, a computer processor will receive set of data representing a split sector, including data defining at least two separate coverage areas of the split sector each emanating through radio frequency (RF) radiation from a cellular base station to define a respective coverage angle having a respective initial side and a respective terminal side. The set of data may thus include for the split sector (i) data defining each underlying coverage angle and (ii) data defining a location of the base station that emanates to provide the underlying coverage areas.

In practice, a wireless carrier may operate (or arrange for operation of) the processor, and the processor may receive the set of data representing the split sector together with data representing numerous other sectors. For instance, the wireless carrier may maintain a database that stores data definitions of many or all of the sectors in the wireless carrier's system (e.g., nationwide). Upon receipt of data regarding numerous sectors, the processor may identify records regarding split sectors (as those sectors for which the data specifies more than one coverage area, such as more than one azimuth and bandwidth, or as those sectors flagged expressly as split sectors). And the processor may then carry out the present method with respect to each split sector, so as to generate a data-representation of the split sector and to then communicate that data representation for use in facilitating a location-based service.

Note that the communication of the data representation could involve sending the data-representation via a network to another entity, such as a PDE, for storage in BSA data. Or if the processor was already part of the recipient entity, the act of communicating the data-representation could involve communicating the data-representation from data storage to the processor, or conveying the data representation or some aspect of the data-representation as an argument in a function call or the like, again to ultimately facilitate implementation of a location-based service.

In accordance with the method, once the processor has received the set of data representing a split sector, the processor will programmatically identify a minimum composite angle spanning the two or more underlying coverage areas of the sector, as described above.

To determine whether or not to represent the split sector as an omni-sector, the processor will then determine whether that minimum composite angle exceeds (e.g., is greater than, or is equal to or greater than) a threshold. A preferred threshold for this purpose is 180°. However, another threshold could be used if desired.

If the processor thereby determines that the minimum composite angle exceeds the threshold, then the processor will generate a data-representation of the split sector as an omni-sector, namely a sector having a beamwidth of 360° and any azimuth (e.g., 0°), so that the base station location would be considered to be the centroid of the sector. On the other hand, if the processor determines that the minimum composite angle does not exceed the threshold, then the processor will generate a data-representation of the split sector as a non-omni-sector, namely a sector having something less than 360° beamwidth and having an azimuth that bisects the minimum composite angle.

The processor will then communicate the established data-representation, to facilitate a location-based service. For instance, after performing this analysis and data generation for numerous sectors of a wireless carrier's system, the processor may transmit the resulting data-representations of the various sectors as BSA data records to a database that stores the BSA data, such as a database at or accessible by a PDE for instance.

As noted above, FIG. 6 is a simplified block diagram of a communications network in or for which the present method can be implemented. The example network of FIG. 6 includes a radio access network (RAN) 100, which functions generally to provide mobile stations with access to one or more transport networks, such as the public switched telephone network (PSTN) 102 and a public or private packet-switched network 104 such as the Internet for instance.

RAN 100 is shown including a representative base transceiver station (BTS) 106, which radiates to define at least one split sector made up of multiple coverage areas shown as coverage areas 108, 110. (As noted above, these coverage areas may or my not overlap in part but will probably not overlap.) The BTS may then communicate via RF communications with a mobile station positioned in the split sector, such as mobile station 112 as shown for instance. Such communication may follow any agreed air interface protocol, examples of which include without limitation CDMA (e.g., 1xRTT, 1xEV-DO), iDEN, WiMAX (e.g., IEEE 802.16), TDMA, AMPS, GSM, GPRS, UMTS, and EDGE, among others now known or later developed. As further noted above, the separate coverage areas of the split sector will operated in combination as a single sector, such as by sharing a coding mechanism and/or sector identification. For example, in a CDMA system, the separate coverage areas of the split sector may both operate with CDMA coding using the same PN offset (and same carrier frequency for instance) and may have the same base station ID as they emanate from the same base station.

The representative BTS 102 is shown coupled with a base station controller (BSC) 114, which is in turn coupled with a mobile switching center (MSC) 116, which provides connectivity with the PSTN 102. Further, the BSC is coupled with a packet data serving node (PDSN) 118, which provides connectivity with a packet-switched network 104. With this arrangement, mobile station 112 can thus communicate through RAN 100 with entities on the PSTN 102 and/or the packet-switched network 104. Those skilled in the art appreciate that other RAN configurations, using other elements or elements with different names, ranging in degree of complexity, are possible as well.

One representative communication that the mobile station may engage in is to contact a location-based-service-provider (LBSP) such as LBSP 120 or 122 as shown in the figure. LBSP 120 is accessible primarily through packet-switched network 104, and so the mobile station may contact LBSP 120 through a data session, such as a wireless web session or a voice over IP session for instance. LBSP 122 is accessible primarily through the PSTN 102, and so the mobile station may contact LBSP 122 through a call via the PSTN. LBSP 122 is further shown coupled with the packet-switched network, to provide LBSP 122 with the ability to communicate with other entities on the packet-switched network. Either or both of these LBSPs may be PSAPs, arranged to respond to emergency service calls. Alternatively, either or both of these LBSPs may be other sorts of location based service providers, providing various services such as those noted above, keyed to mobile station location. Furthermore, any such location based service provider may provide a location based service without being in communication with the mobile station whose location is at issue. For instance, some other entity on the PSTN or packet-switched network could contact the location based service provider to request the location of a mobile station or to request that a service be provided based on the location of a mobile station.

Figure 6:
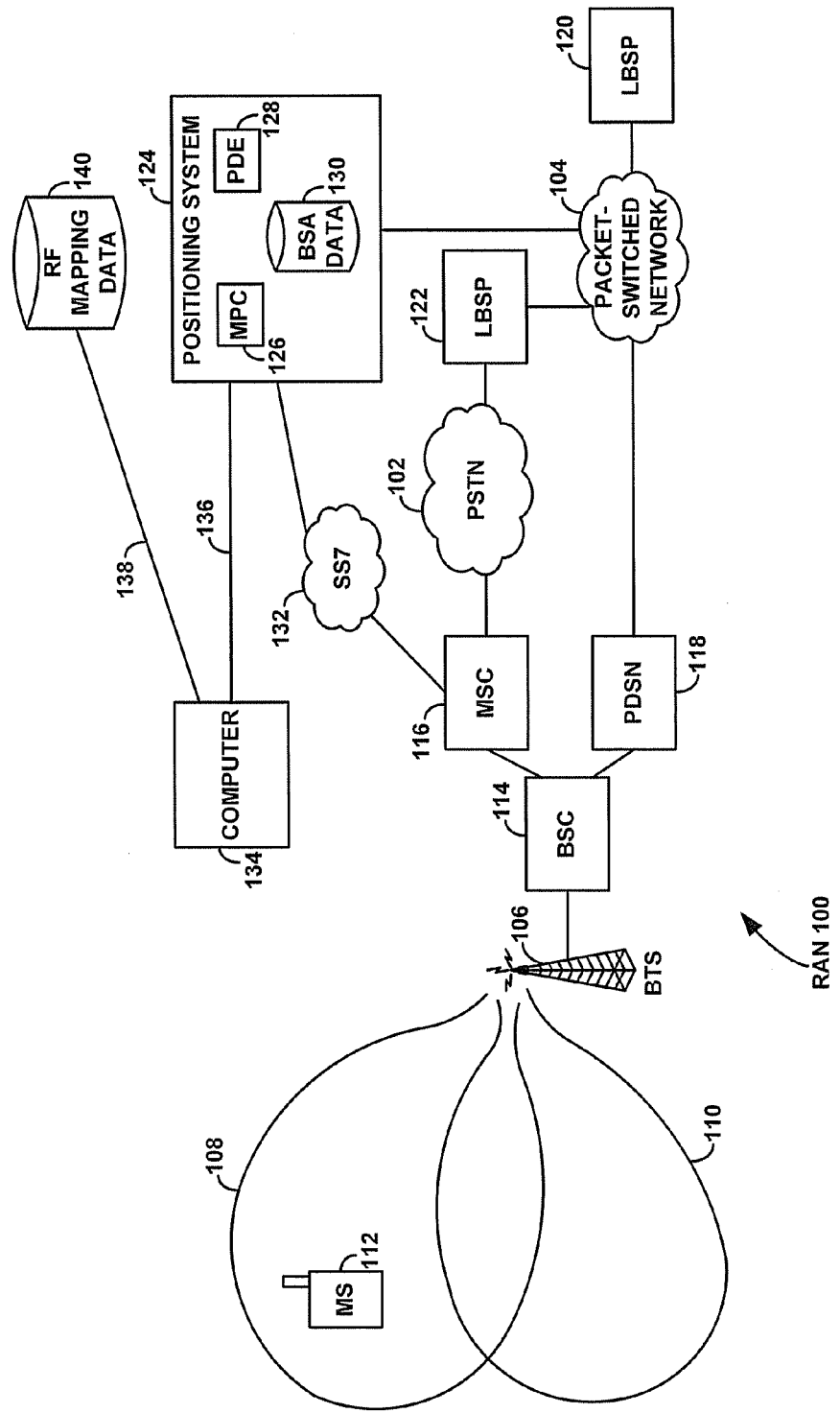
FIG. 6 is a simplified block diagram of a communication network in which the present method and apparatus can be implemented.

FIG. 6 also depicts an example positioning system 124, which may be operated by or on behalf of the wireless carrier that operates RAN 100 and may be arranged to determine and report mobile station locations to requesting entities. As shown, the positioning system 124 may include a mobile positioning center (MPC) 126 and a position determining entity (PDE) 128, which may be integrated together. Further, the positioning system is shown including BSA data 130, although the BSA data could just as well be located external to the positioning system and made accessible to the positioning system to extent necessary to facilitate determining of mobile station location.

As shown, the positioning system 124 is coupled via a signaling network (depicted as an Signaling System #7 (SS7) network) 132 with MSC 116. This connection enables MSC 116 to signal to the positioning system when the mobile station places an emergency services call. That way, the MSC can cause the positioning system to begin determining the mobile station's location upon placement of such a call. The MSC may then receive the determined location from the positioning system and provide it in call setup signaling to the PSAP, or the PSAP can query the positioning system to obtain the determined location information, so as to facilitate emergency response.

Further, FIG. 6 depicts a computer 134 coupled by a communication link 136 with the positioning system 124 and by a communication link 138 with an RF mapping database 140 that includes data characterizing sectors throughout the wireless carrier's system. These components can be integrated in any way if desired. For instance, the computer 134 could be part of the positioning system, the communication links 136, 138 (which could be network links of any sort) could be a common link (possibly common with packet-switched network 104), and the RF mapping database could be situated at the positioning system and/or stored in the computer. Further, any of these components can be distributed or rearranged in other ways. Numerous other variations to these components and others shown in the figure are possible in a similar manner.

Figure 7:
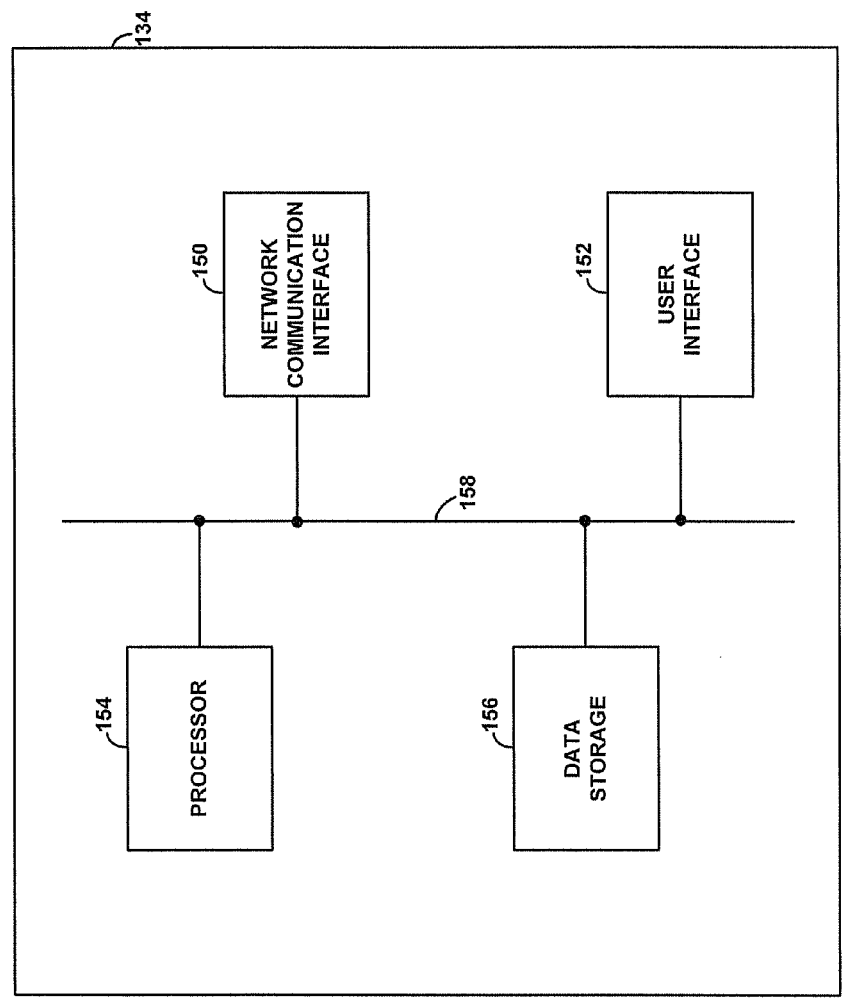
FIG. 7 is a simplified block diagram of an apparatus arranged to implement the present method.

In a preferred implementation, computer 134 is programmed to carry out the functions of the present method, receiving a set of data characterizing a split sector, establishing a data-representation of the split sector, and communicating the data-representation for use to facilitate a location-based service. FIG. 7 is a simplified block diagram depicting components of such a computer 134.

As shown in FIG. 7, the computer 134 includes a network communication interface 150, a user interface 152, a processor 154, and data storage 156, all of which may be communicatively linked together by a system bus or other connection mechanism 158.

Network communication interface 150 functions to connect computer 134 with a network so as to facilitate communication with other entities such as positioning system 124 and RF mapping database 140. As such, the network communication interface may comprise a wired or wireless Ethernet network interface module, or may take other forms.

User interface 152, in turn, comprises input and output components to enable a user to interact with the computer. For example, the user interface 152 may include input components such as a keyboard, mouse, and microphone, and the user interface 152 may include output components such as a display and sound speaker. Processor 154 comprises one or more general purpose processors (such as INTEL processors or the like) and/or one or more special purpose processors (such as digital signal processors or application specific integrated circuits). If processor 154 includes more than one processor, the processors could work separately or in combination (e.g., in parallel). Further, the processors could be processors located at separate locations and perhaps part of separate entities.

Data storage 156, in turn, comprises one or more volatile or non-volatile storage components, such as optical, magnetic, or organic storage discs, storage drives, or other storage mechanisms, and may be integrated in whole or in part with processor 154. Data storage 64 preferably holds program code that is executable by processor 154 to carry out various functions described herein to characterize and communicate the location of a split sector, so as to facilitate implementation of a location-based service.

Figure 8:
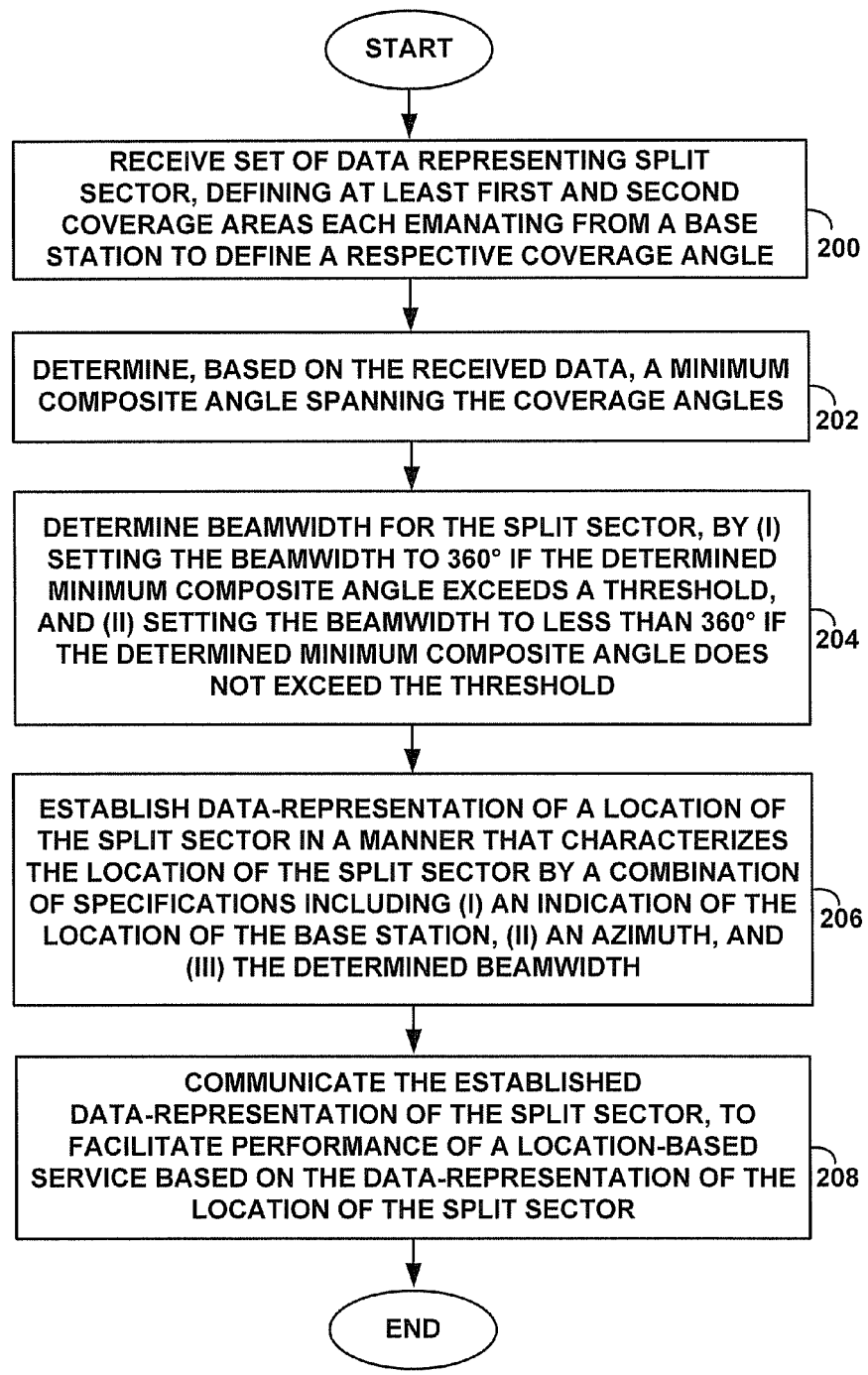
FIG. 8 is a flow chart depicting functions that can be carried out in accordance with the present method.

FIG. 8 is a flow chart depicting functions that can be implemented by computer 134 and/or another apparatus in accordance with the present method, to communicate geographic location of a split sector of a cellular wireless communication system, so as to facilitate a location-based service, such as emergency response for instance.

As shown in FIG. 8, at step 200, the processor 154 receives a set of data representing the split sector, via communication interface 150 for instance, and from RF mapping database 140 or elsewhere. As explained above and illustrated in FIGS. 4 and 5 by way of example, the split sector defines at least first and second coverage areas, with each coverage area emanating through radio frequency (RF) radiation from a cellular base station to define a respective coverage angle having a respective initial side and a respective terminal side. The set of data received by the processor 154 may thus include (i) data defining each coverage angle and (ii) data defining a location of the base station. The data defining each coverage angle may define each angle by its azimuth and its beamwidth, with the understanding that the beamwidth is centered about the azimuth. The data defining the base station location may be latitude/longitude coordinates or may just as well be a base station identifier that processor 154 or some other entity could look up in appropriate lookup data to correlate with the location of the base station.

At step 202, the processor 154 determines, based on the received set of data, a minimum composite angle that spans the coverage angles of the coverage areas of the split sector. As explained above, there could be two possible composite angles that span the coverage angles of the split sector (i.e., that extends from the edge of one to and edge of the other and that encompasses each of the coverage angles). The one at issue here is the minimum composite angle, i.e., the smaller of the two.

At step 204, the processor 154 then determines a beamwidth for the split sector, by (i) setting the beamwidth to 360° if the determined minimum composite angle exceeds a threshold, and (ii) setting the beamwidth to less than 360° if the determined minimum composite angle does not exceed the threshold. For this purpose, the threshold could be 180° or could be set at some other desired value.

At step 206, the processor 154 then establishes a data-representation of a location of the split sector in a manner that characterizes the location of the split sector by a combination of specifications including (i) an indication of the location of the base station, (ii) an azimuth, and (iii) the determined beamwidth. The established data representation can be a database record, a table, or other data structure providing these and perhaps other specifications that work to characterize the split sector as a single sector, preferably in a manner suitable for storage as a BSA data record (or part of such a record) for the split sector. Here, the indication of the location of the base station can again be latitude/longitude coordinates or some sort of base station ID that can be correlated with such location, and the determined bandwidth would be the 360° or less than 360° value as described above.

In terms of the azimuth in the established data-representation of the split sector, the processor may establish an azimuth value in a manner depending again on whether the minimum composite angle exceeds the threshold. If it exceeds the threshold, and the processor therefore sets the beamwidth of the split sector as 360°, then the processor may pick any azimuth value (e.g., 0°), since azimuth will not matter for an omni-directional sector. Thus, the processor may pick the azimuth in a manner that does not take into consideration the underlying coverage angles. On the other hand, if the minimum composite angle does not exceed the threshold, and the processor therefore sets the beamwidth of the split sector to something less than 360°, then the processor may set the azimuth to a direction bisecting the composite coverage angle, i.e., halfway between the outer edge of one coverage area and the outer edge of the other coverage angle.

At step 208, the processor then communicates the established data-representation of the split sector, to facilitate performance of a location-based service based on the data-representation of the location of the split sector. As noted above, this may involve communicating the established data-representation via a communication network to a PDE or other entity for storage as BSA data for the split sector, which can then be used to facilitate characterizing (approximating) the location of a mobile station operating in the split sector, so as to facilitate a location-based service.

Figure 9:
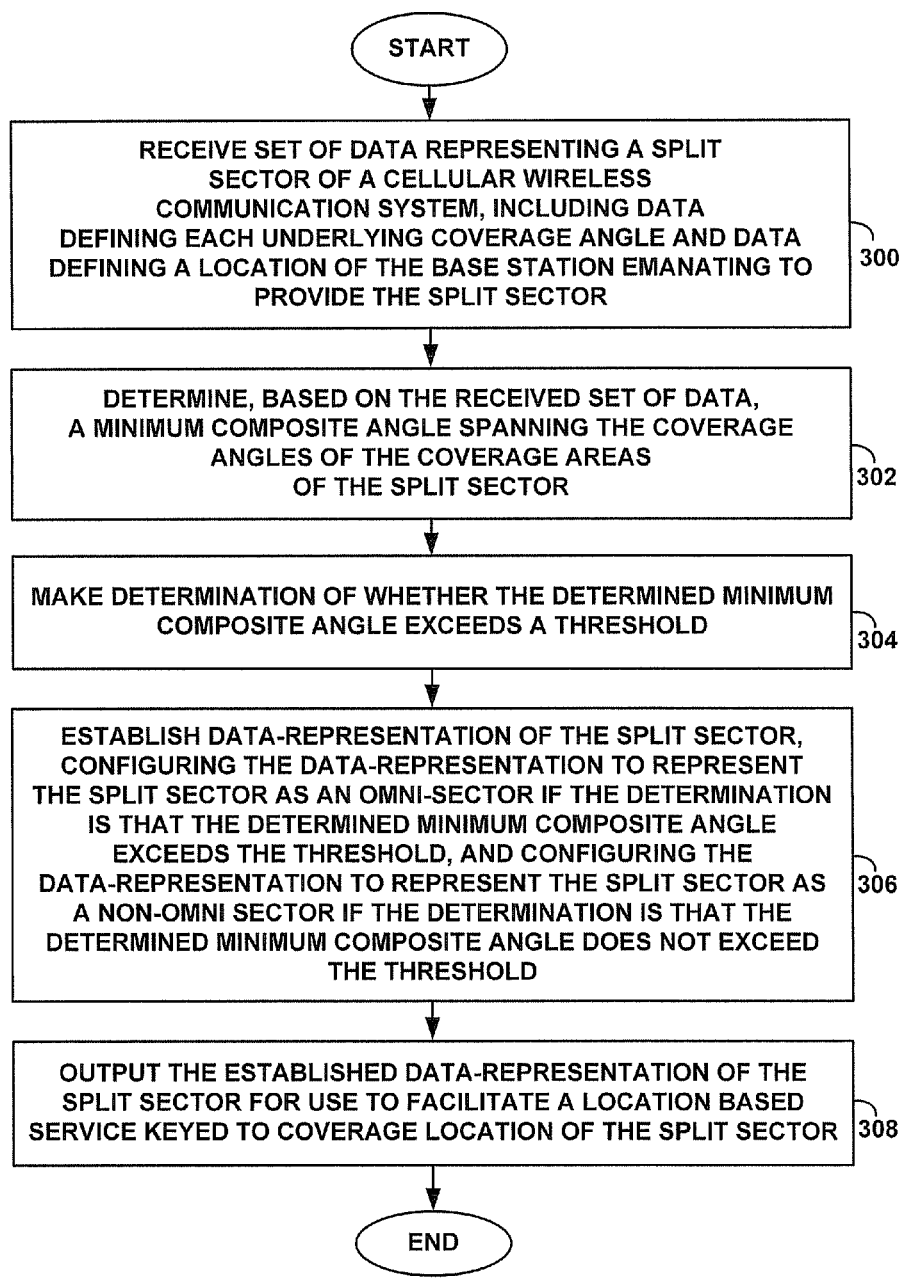
FIG. 9 is another flow chart depicting functions that can be carried out in accordance with the present method.

FIG. 9 is next another flow chart depicting functions that can be implemented in accordance with the method. This flow chart characterizes the method in a slightly different way than FIG. 8.

As shown in FIG. 9, at step 300, a processor receives a set of data representing a split sector of a cellular wireless communication system. Again, this set of data may define at least first and second separate coverage areas each emanating through radio frequency (RF) radiation from a cellular base station to define a respective coverage angle having a respective initial side and a respective terminal side, and the set of data may thus include (i) data defining each coverage angle and (ii) data defining a location of the base station.

At step 302, the processor may then determines, based on the received set of data, a minimum composite angle spanning the coverage angles of the coverage areas of the split sector. And at step 304, the processor makes a determination of whether the determined minimum composite angle exceeds a threshold, such as 180 degrees for instance.

At step 306, the processor then establishes a data-representation of the split sector, configuring the data-representation to represent the split sector as an omni-sector if the determination is that the determined minimum composite angle exceeds the threshold, and configuring the data-representation to represent the split sector as a non-omni sector if the determination is that the determined minimum composite angle does not exceed the threshold.

At step 308, the processor then outputs the established data-representation of the split sector for use to facilitate a location based service keyed to coverage location of the split sector. As with the method as described above, for instance, the processor may communicate the established data-representation via a communication network, pass it between functions, or otherwise communicate the data-representation.

Those of ordinary skill in this technology area will appreciate that the methods depicted by FIGS. 8 and 9 and described throughout this document can be readily embodied as computer readable program code on a computer readable medium, such as the data storage described above for instance. FIG. 10 presents an example of such a program code listing, written in Microsoft Visual Basic for Applications (which can be compiled and executed by an INTEL processor in a manner well known in the art). This example code listing assumes that the split sector at issue has two underlying coverage areas, one having an azimuth az1 and a beamwidth bw1, and the other having an azimuth az2 and a beamwidth bw2. The program is then executable to generate an output a value splitbw as a representation of the beamwidth of the split sector, and a value splitaz as a representation of the azimuth of the split sector. A processor may then communicate this data, together with an indication of the base station location, for storage as BSA data for the split sector.

An exemplary embodiment has been described above. It is understood, however, that numerous changes may be made to the embodiment described, while remaining within the spirit and scope of the invention as claimed.

What is claimed is:

1. A method of communicating a geographic location of a split sector of a cellular wireless communication system, to facilitate a location-based service, the method comprising:
receiving into a computer processor a set of data representing the split sector, wherein the split sector defines at least first and second coverage areas each emanating through radio frequency (RF) radiation from a cellular base station to define a respective coverage angle having a respective initial side and a respective terminal side, wherein the set of data includes (i) data defining each coverage angle and (ii) data defining a location of the base station;
the computer processor determining, based on the received set of data, a minimum composite angle that spans the coverage angles of the coverage areas of the split sector;
the computer processor determining a beamwidth for the split sector, by (i) setting the beamwidth to 360° if the determined minimum composite angle exceeds a threshold, and (ii) setting the beamwidth to less than 360° if the determined minimum composite angle does not exceed the threshold;
the computer processor establishing a data-representation of a location of the split sector, the data-representation characterizing the location of the split sector by a combination of specifications including (i) an indication of the location of the base station, (ii) an azimuth, and (iii) the determined beamwidth; and
the computer processor communicating the established data-representation of the location of the split sector, to facilitate performance of a location-based service based on the data-representation of the location of the split sector.

2. The method of claim 1, further comprising:
if the determined minimum composite angle does not exceed the threshold, then the computer processor setting the azimuth in the data-representation to be an angle bisecting the minimum composite angle.

3. The method of claim 2, wherein the threshold is 180 degrees.

4. The method of claim 1, wherein communicating the established data-representation of the location of the split sector comprises transmitting the established data-representation via a communications network for storage as a record in base-station-almanac data usable to determine a coverage location of the base station.

5. The method of claim 1, wherein the location-based service comprises locating a mobile station positioned in the split sector.

6. The method of claim 1, wherein the location-based service is selected from the group consisting of (i) emergency assistance, (ii) weather reporting, (iii) traffic reporting, (iv) mapping and (v) route planning.

7. The method of claim 1, wherein the received set of data defines each of the separate coverage areas of the split sector by specifying, respectively for each coverage area, at least a coverage area azimuth and a coverage area beamwidth.

8. The method of claim 1, wherein the received set of data defines the base station location at least in part with latitude and longitude coordinates.

9. The method of claim 1, wherein receiving the set of data comprises receiving the set of data via a communication network from a database system.

10. The method of claim 1, wherein the split sector is a Code Division Multiple Access (CDMA) sector, and wherein the first and second separate coverage areas of the split sector share a common PN-offset.

11. An apparatus comprising a non-transitory computer readable medium having a computer readable program code embodied therein, said computer readable program code being adapted to be executed to implement a method for generating a data-representation of a location of split sector of a cellular wireless communication system, for use of the data-representation to facilitate a location-based service, the method comprising:
receiving a set of data representing the split sector, wherein the split sector defines at least first and second separate coverage areas each emanating through radio frequency (RF) radiation from a cellular base station to define a respective coverage angle having a respective initial side and a respective terminal side, wherein the set of data includes (i) data defining each coverage angle and (ii) data defining a location of the base station;
determining, based on the received set of data, a minimum composite angle spanning the coverage angles of the coverage areas of the split sector;
determining a beamwidth for the split sector, by (i) setting the beamwidth to 360° if the determined minimum composite angle exceeds a threshold, and (ii) setting the beamwidth to less than 360° if the determined minimum composite angle does not exceed the threshold; and
generating as the data-representation a set of output data characterizing the location of the split sector by a combination of specifications including (i) an indication of the location of the base station, (ii) an azimuth, and (iii) the determined beamwidth.

12. The apparatus of claim 11, further comprising:
a communication interface; and
a processor;
wherein receiving the set of data comprises the processor receiving the set of data via the communication interface,
wherein the processor stores the received set of data in the computer readable medium,
wherein determining the minimum composite angle comprises the processor determining the minimum composite angle,
wherein determining the beamwidth comprises the processor determining the beamwidth, and
wherein generating the data-representation comprises the processor generating the data-representation.

13. The apparatus of claim 12, wherein the processor communicates the established data-representation of the location of the split sector via the communication interface, to facilitate performance of a location-based service based on the data-representation of the location of the split sector.

14. The apparatus of claim 13, wherein the processor communicates the established data-representation via a communications network for storage as a record in base-station-almanac data usable by a position determining entity to determine a coverage location of the base station.

15. The apparatus of claim 12, wherein:
if the determined minimum composite angle does not exceed the threshold, then the processor sets the azimuth in the data-representation to be an angle bisecting the minimum composite angle.

16. The apparatus of claim 12, wherein the threshold is 180 degrees.

17. The apparatus of claim 12, wherein the location-based service comprises locating a mobile station positioned in the split sector.

18. The apparatus of claim 12, wherein the location-based service is selected from the group consisting of (i) emergency assistance, (ii) weather reporting, (iii) traffic reporting, (iv) mapping and (v) route planning.

19. An apparatus comprising:
a communication interface;
a processor; and
data storage,
wherein the processor receives a set of data representing a split sector of a cellular wireless communication system, wherein the split sector defines at least first and second separate coverage areas each emanating through radio frequency (RF) radiation from a cellular base station to define a respective coverage angle having a respective initial side and a respective terminal side, wherein the set of data includes (i) data defining each coverage angle and (ii) data defining a location of the base station,
wherein the processor determines, based on the received set of data, a minimum composite angle spanning the coverage angles of the coverage areas of the split sector,
wherein the processor makes a determination of whether the determined minimum composite angle exceeds a threshold,
wherein the processor establishes a data-representation of the split sector, configuring the data-representation to represent the split sector as an omni-sector if the determination is that the determined minimum composite angle exceeds the threshold, and configuring the data-representation to represent the split sector as a non-omni sector if the determination is that the determined minimum composite angle does not exceed the threshold, and
wherein the processor outputs the established data-representation of the split sector for use to facilitate a location based service keyed to coverage location of the split sector.

20. The apparatus of claim 19, wherein the threshold is 180 degrees.

* * * * *